(12) United States Patent
Mussatt et al.

(10) Patent No.: US 7,752,372 B2
(45) Date of Patent: Jul. 6, 2010

(54) PCI EXPRESS (PCIE) COMMUNICATION SYSTEM

(75) Inventors: Kip Mussatt, San Diego, CA (US); Damian Wieczorek, Escondido, CA (US)

(73) Assignee: Mission Technology Group, Inc., San Diego, CA (US)

( * ) Notice: Subject to any disclaimer, the term of this patent is extended or adjusted under 35 U.S.C. 154(b) by 0 days.

(21) Appl. No.: 11/642,159

(22) Filed: Dec. 20, 2006

(65) Prior Publication Data
US 2008/0155156 A1    Jun. 26, 2008

(51) Int. Cl.
*G06F 13/00* (2006.01)
(52) U.S. Cl. ........................... 710/301; 710/306
(58) Field of Classification Search ......... 710/300–306, 710/311–317, 8–12; 713/320, 324, 322
See application file for complete search history.

(56) References Cited

U.S. PATENT DOCUMENTS

| | | | |
|---|---|---|---|
| 5,563,622 A * | 10/1996 | Person et al. | 345/75.1 |
| 6,721,838 B1 | 4/2004 | Lim | |
| 6,825,693 B2 * | 11/2004 | Schoenborn et al. | 326/86 |
| 6,906,549 B2 * | 6/2005 | Schoenborn et al. | 326/30 |
| 6,985,152 B2 * | 1/2006 | Rubinstein et al. | 345/520 |
| 7,065,597 B2 * | 6/2006 | Kumar et al. | 710/260 |
| 7,069,369 B2 * | 6/2006 | Chou et al. | 710/301 |
| 7,203,853 B2 * | 4/2007 | Martwick et al. | 713/320 |
| 7,343,498 B2 * | 3/2008 | Morrow | 713/300 |
| 2006/0285803 A1 | 12/2006 | Crews | |
| 2008/0046624 A1 * | 2/2008 | Rubin et al. | 710/302 |

OTHER PUBLICATIONS

WO Int'l Search Report, Nov. 26, 2008, Mission Technology Group.
WO Int'l Written Opinion, Nov. 26, 2008, Mission Technology Group.
Pericom; PI2EQX4401D; 2.5Gbps x 1 Lane Serial PCI-Express Repeater/Equalizer with Clock Buffer & Signal Detect Feature Pericom Product Spec, Nov. 17, 2006.
Pericom; PI2EQX4402D; 2.5Gbps x 2 Lane Serial PCI Express Repeater/Equalizer with Signal Detect feature Pericom Product Spec, Nov. 16, 2006.
Pericon; PI2EQX5864; 5.0Gbps 4-Lane PCI Express GenII Re-Driver with Equalization, Emphasis, & I2C Control; Pericom Product Spec, Jan. 21, 2006.
International Search Report and Written Report; 10 pages; Jun. 9, 2008.

* cited by examiner

*Primary Examiner*—Raymond N Phan
(74) *Attorney, Agent, or Firm*—Robert C. Klinger

(57) ABSTRACT

A device, system and method adapted to expand a high speed data bus, such as a PCI Express (PCIe) bus, over a serial link with an expansion unit having a high speed data bus, such as a PCIe bus, without using a bridging or switching device. One primary advantage of not using a bridge or switch is that the expansion interface is completely transparent to the BIOS, processor, CPU, OS, or any other component(s) on the host motherboard be they hardware, firmware, or software. This invention does not require additional protocols such as TCP/IP, Serial ATA, Gigabit Ethernet, etc. There is also no implicit hardware or device driver latency resulting from a bridge or switch.

10 Claims, 3 Drawing Sheets

PCI EXPRESS (PCIE) COMMUNICATION SYSTEM

FIELD OF THE INVENTION

The present invention relates to expansion of high speed bus data communications over a serial link including PCI Express, commonly referred to as PCIe.

DEFINITIONS

Peripheral card shall refer to a card that plugs into a data bus. Examples include, but are not limited to: SCSI controller, video cards, sound cards, USB cards, etc.

An "Expansion unit" shall refer to any device that extends or expands a bus outside of its normal physical environment. An expansion unit is intended for normal use of a peripheral card(s).

"Extension card" shall refer to a card or short cable that does not expand a bus outside of its environment, but allows for the bus to be more easily accessed for debug while in its environment. It is not intended for normal use. Catalyst (www.getcatalyst.com) makes several extension cards that fall into this category.

Bridging device (chip) shall refer to a chip which interfaces data signals from one bus to another bus. Examples of a bridge chip include, but are not limited to: 41210 (Intel), PEX8111 (PLX), XIO2000 (TI).

Switch device (chip) is a logical bridge device. It is the PCIe equivalent of a PCI bridge. Examples of this are the uPD720401 (NEC), PEX8508 (PLX), XIO3130 (TI).

BACKGROUND OF INVENTION

FIG. 1 shows at 10 the general concept of expanding or extending a host parallel data bus over a serial link to make the PCI/PCIe bus (PCIe is an derivative of the PCI bus) available on an expansion system. Using this system, the host BIOS/OS will see at least one bridge or switch device 12 in a device manager (or similar program) regardless of whether or not any host expansion slots are populated with peripheral cards. If peripheral cards are present, they will also show up. Under normal conditions, the peripheral card will (should) always be visible to the host system regardless of whether a unit is in the host system, hanging on an extension card, or in an expansion unit. One such technology is the Split Bridge™ expansion technology sold by Mobility Electronics, Inc. of Scottsdale, Ariz., the teachings of which are incorporated herein by reference.

The conventional expansion bridge or switch 12 uses such techniques as clock recovery or external clock generation and alignment to ensure the correct clock-data protocol is maintained. The bridge/switch 12 also handles such things as reset, wake, and other side band signals used to ensure proper peripheral card functioning.

SUMMARY OF INVENTION

The invention achieves technical advantages as a device, system and method adapted to expand a high speed data bus, such as a PCI Express (PCIe) bus, over a serial link with an expansion unit having a high speed data bus, such as a PCIe bus, without using a bridging or switching device. One primary advantage of not using a bridge or switch is that the expansion interface is completely transparent to the BIOS, processor, CPU, OS, or any other component(s) on the host motherboard be they hardware, firmware, or software. This invention does not require additional protocols such as TCP/IP, Serial ATA, Gigabit Ethernet, etc. There is also no implicit hardware or device driver latency resulting from a bridge or switch.

DETAILED DESCRIPTION OF THE PRESENT INVENTION

Figure 2:
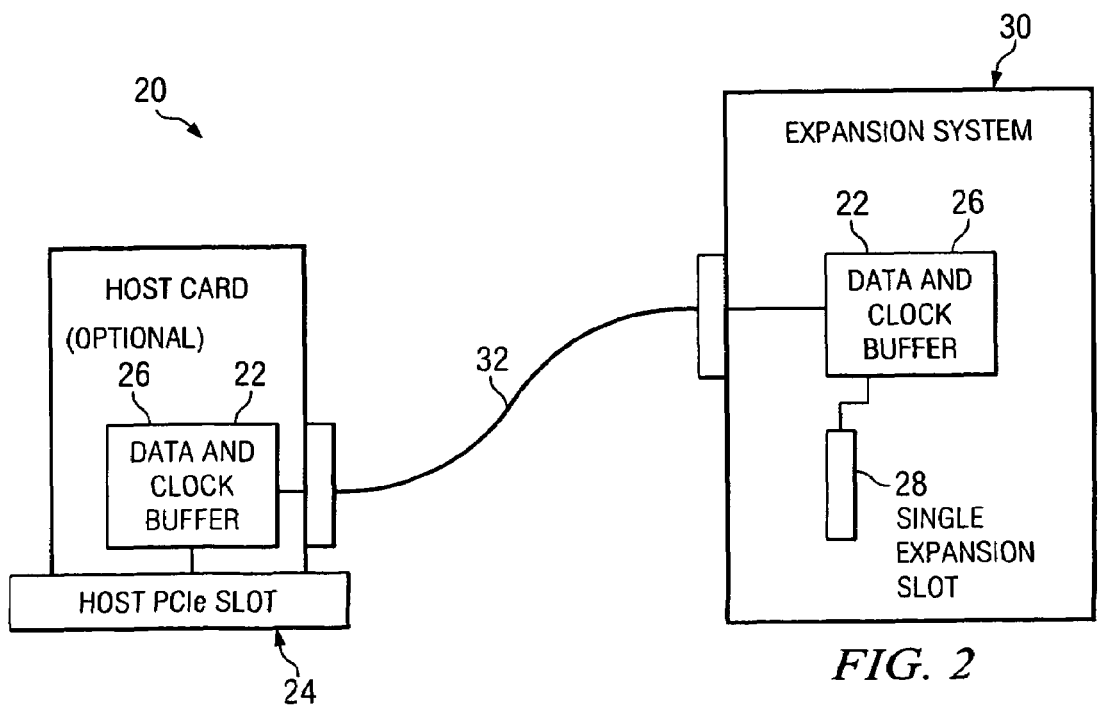
FIG. 2 depicts one embodiment of the invention providing serial expansion of a host serial data bus to an expansion system without using a bridging or switching device.

FIG. 2 depicts one embodiment of the invention at 20 comprising a host 22 having a host data bus 24 and an interface 26 that extends the host bus 24 to an expansion system data, data bus 28 of expansion system 30 over a serial data cable 32 using a very transparent method. The interface 26 includes a data and clock buffer that conditions data and clock signals, such as those available from Pericom, Maxim, and National Semiconductor and all sideband interface circuits that control WAKE# and PERST#.

Figure 3:
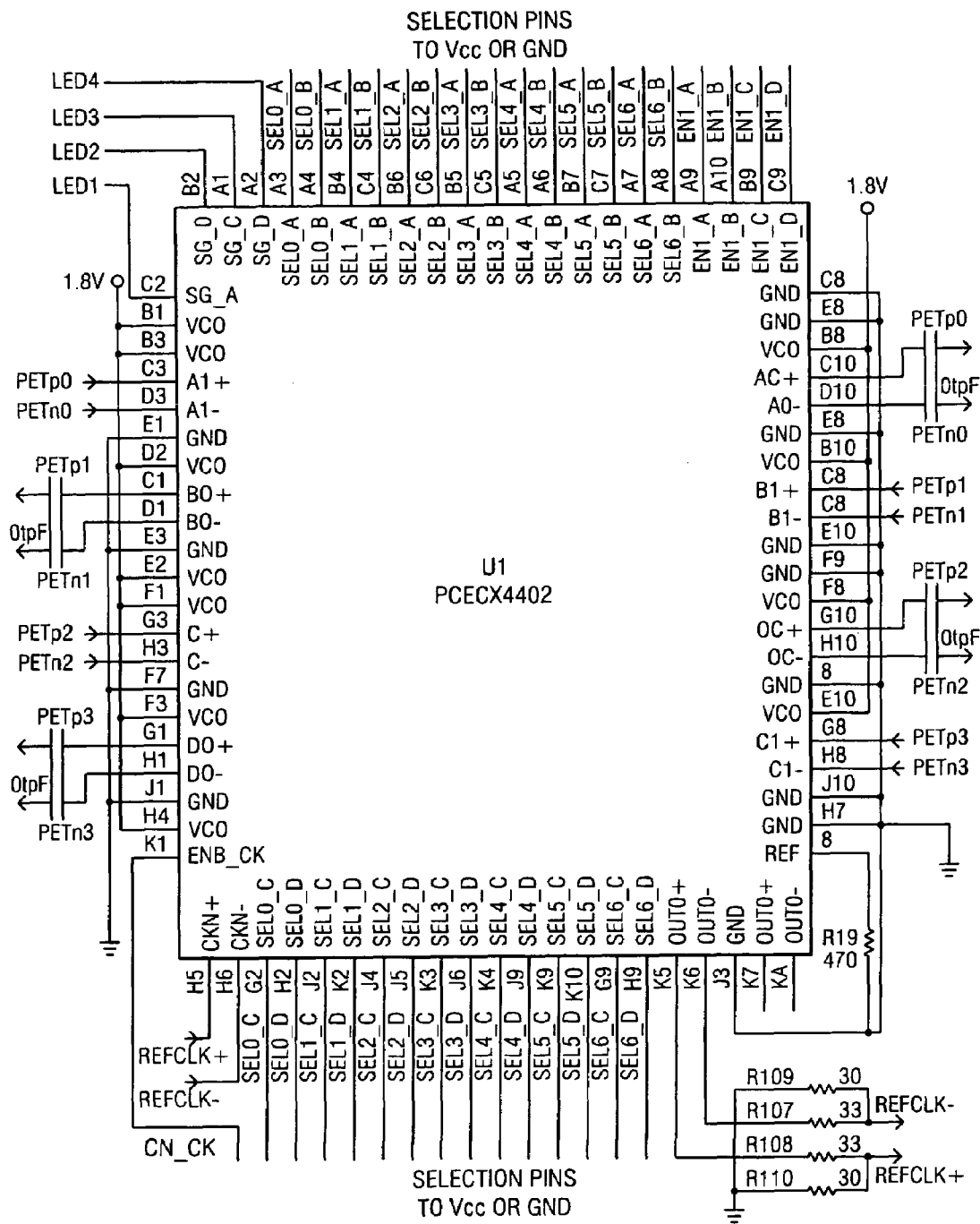
FIG. 3 depicts a data and clock buffer adapted to buffer signals communicated from one end of the serial link to the other end.

According to the invention, these buffers 22 strengthen the PCIe clock and/or data signals to levels outside of what is called for in the PCI Express Specification to compensate for cable loss of the signals. Using this interface and method, the BIOS/OS will not see any device in the expansion system until the expansion slot is populated with an add-in card. This is because the buffers 22 do not interact with the signals other than to condition them to levels to compensate for subsequent cable loss. The data being transmitted and received is not changed or delayed, or wrapped in a secondary protocol, such as TCP/IP, by this invention, unlike a bridge or switch. This buffer 22 may be a PI2EQX4 driver manufactured by Pericom Semiconductor Corporation, shown in FIG. 3.

Advantageously, this invention provides sideband signal processing in the interface 26 on either or both of the host and expansion that also processes side band signals, such as PERST# (reset) and WAKE# (system wake up), etc., which side band signals are handled in such a way as to not interfere with the power-on sequence of the peripheral card 22 when the host system is off, or not yet attached.

Figure 4:
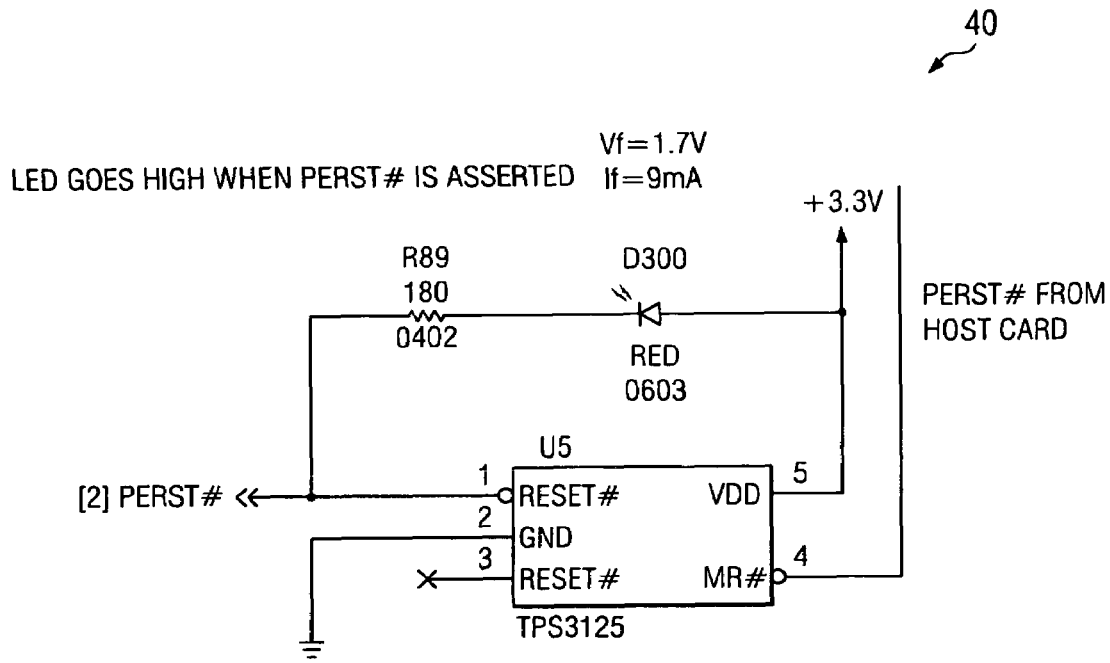
FIG. 4 depicts an interface circuit configured to process sideband signals.

Referring to FIG. 4, there is shown an electrical schematic diagram of an signal processing module 40 that is integrated in interface 26 and that processes a sideband signal such that the signal is passed on to the expansion interface after power at the expansion interface is stable. In one embodiment, a power-on reset monitor circuit 42 ensures power $V_{DD}$ is stable a finite period of time that meets the PCIe specification, before passing on the sideband signal, such as PERST# or WAKE#. Other signals, such as PRSNT# (peripheral card present), are handled in such a way as to ensure the host system understands how many lanes (connections to) the expansion system it has available, which aids in link training right after power up regardless of the lanes the peripheral card may have available.

Figure 5:
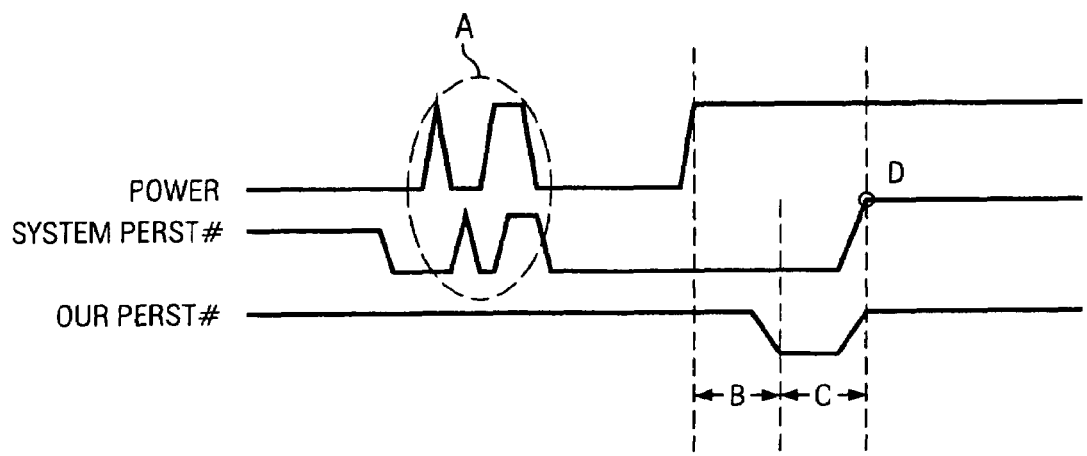
FIG. 5 depicts a waveform diagram of the host expansion slot power and a processed sideband signal according to the invention.

Basically, what can happen in a laptop is as the PCIe slot power in the laptop comes up as shown in FIG. 5, (not to be confused with main power but the +3.3V and +1.5V $V_{DD}$ power in the Express slot), the slot power can go up and down/glitch before stabilizing, as shown at 'A'. This glitch causes problems initiating sideband signal, such as PERST#, since the glitch does violate the PCIe specification. The add-in card in the expansion system will usually not behave properly if it even comes out of reset at this point, because the system power (for the host card) was not stable before PERST# was deasserted, shown at point 'D.' This embodiment of the invention incorporates the small reset monitor chip 42 that ensures Power $V_{DD}$ to be good for some finite determined amount of time that meets the PCIe specification before it passes the sideband signal, such as System PERST#, through. This time is shown at 'B.' The add-in card sees PERST# for time 'C', which time 'C' meets the PCIe specification and ensure that spikes in the power do not lock up or fowl the system.

Sideband signal WAKE# is handled much easier and in a conventional method, it is passed through. The invention lets WAKE# float and the host system pulls this line high. Since it is active low, it is never asserted. This may seem odd, but as the system powers up, spikes and noise on this line can cause erratic behavior. Furthermore, in using adapter cards that allow PCIe E-cards to be used in Desktop host computers, the desktop PC turns on (from being powered off) when these cards are plugged in. In most cases, this is attributed it to the presence of the WAKE# signal as the inserted card is plugged in, it is detected before it has been able to pull WAKE# after its power on sequence.

Figure 1:
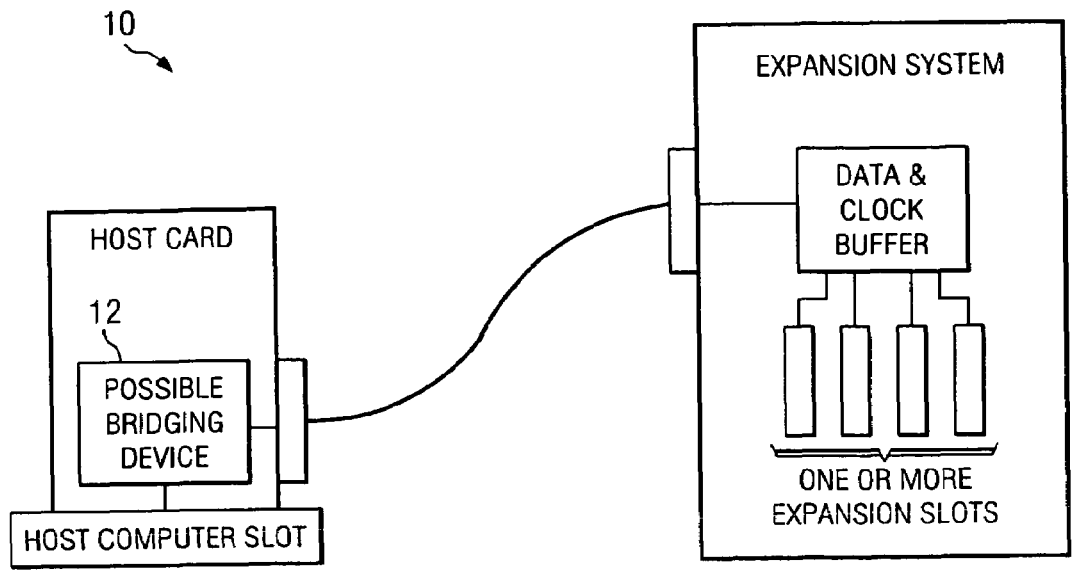
FIG. 1 depicts a block diagram of a legacy parallel data bus expanded by a serial cable to an expansion system using a prior art bridging or switching device.

This present invention is superior and unique because it does not require a bridge (or switching device), additional drivers, or any resources to be allocated for this type of high speed serial expansion system. In contrast, any peripheral card drivers/resources required in the case of FIG. 1, caching or other bridge/switch attributes will decrease performance because there will always be some latency in distributing the packets through a bridge or switch. The invention is faster for a single slot expansion than a similar system (for a single slot) using a bridge or switch device.

This invention differs from an extension card in that it offers the ability to use the peripheral card under normal or even better conditions juxtaposed to the ability of an extension card which would usually require removal of the host system cover and an unorthodox method of securing the peripheral card in place.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A PCI Express (PCIe) communication system comprising:
    a host receiving bus data and power, configured to serially transmit PCIe compliant signals;
    a serial link electrically coupled to the host;
    a receiver electrically coupled to the serial link and configured to receive the serially transmitted PCIe signals;
    a driver electrically coupled to the host and configured to amplify the transmitted PCIe signals, whereby the amplified PCIe signals sent by the driver do not meet the PCIe Specification requirements, but which said amplified PCIe signals do meet the PCIe Specification requirements at the receiver; and
    the host including an interface processing a sideband signal such that the side band signal is passed after the power has stabilized.

2. The PCIe communication system as specified in claim 1 wherein the serial link can be, but is not required to be, a PCIe Specification compliant cable.

3. The PCIe communication system as specified in claim 1 wherein the interface is synchronized with the host power and is adapted to process a PERST# sideband signal.

4. The PCIe communication system as specified in claim 3 wherein the interface delays the PERST# signal until the power is stable a predetermined time period.

5. A driver adapted to couple to a data bus having power and amplify received PCIe compliant signals, whereby the PCIe compliant signals sent by the driver do not meet the PCIe Specification requirements, which said received signals do meet the PCIe Specification requirements without the driver, and further including an interface processing a sideband signal such that the sideband signal is sent after the power has stabilized.

6. The driver as specified in claim 5 wherein the driver is configured to deliver the PCIe signals that meet the PCIe Specification at a receiver when sent over the cable which cable may not be compliant with the PCIe Specification.

7. PCI Express (PCIe) communication system comprising:
    a host receiving bus data and power, configured to serially transmit PCIe compliant signals;
    a serial link electrically coupled to the host;
    a receiver electrically coupled to the serial link and configured to receive the serially transmitted PCIe signals;
    a driver electrically coupled to the host and configured to amplify the transmitted PCIe signals, whereby the amplified PCIe signals sent by the driver do not meet the PCIe Specification requirements, but which said amplified PCIe signals do meet the PCIe Specification requirements at the receiver; and
    processing means for processing a sideband signal such that the side band signal is passed after the power has stabilized.

8. The PCIe communication system as specified in claim 7 wherein the serial link can be, but is not required to be, a PCIe Specification compliant cable.

9. The PCIe communication system as specified in claim 7 wherein the processing means is synchronized with the host power and is adapted to process a PERST# sideband signal.

10. The PCIe communication system as specified in claim 9 wherein the processing means delays the PERST# signal until the power is stable a predetermined time period.

* * * * *